United States Patent [19]

Layden

[11] Patent Number: 5,061,423
[45] Date of Patent: Oct. 29, 1991

[54] INJECTION MOLDING OF FIBER REINFORCED ARTICLES

[75] Inventor: George K. Layden, West Hartford, Conn.

[73] Assignee: United Technologies Corporation, Hartford, Conn.

[21] Appl. No.: 410,195

[22] Filed: Sep. 21, 1989

[51] Int. Cl.⁵ .......................................... B29C 00/00
[52] U.S. Cl. ....................................... 264/108; 65/3.2; 264/328.12; 264/328.18
[58] Field of Search ................ 264/108, 328.1, 328.12, 264/328.18, 257, 258, 328.4, 328.5, 272.1, 45; 425/568, 544, 571, 572, 542, 543, 544; 65/3.2

[56] References Cited

U.S. PATENT DOCUMENTS

| | | | |
|---|---|---|---|
| 3,926,904 | 12/1975 | Scola | 260/42.28 |
| 4,314,852 | 2/1982 | Brennan et al. | 501/88 |
| 4,324,843 | 4/1982 | Brennan et al. | 428/697 |
| 4,412,854 | 11/1983 | Layden | 65/18.1 |
| 4,428,763 | 1/1984 | Layden | 65/4.21 |
| 4,464,192 | 8/1984 | Layden et al. | 65/18.1 |
| 4,780,432 | 10/1988 | Minford et al. | 501/32 |
| 4,786,304 | 11/1988 | Chen | 65/18.1 |

FOREIGN PATENT DOCUMENTS 1251641  10/1971  United Kingdom .

*Primary Examiner*—James Lowe
*Assistant Examiner*—Christopher A. Fiorilla
*Attorney, Agent, or Firm*—Pamela J. Mercier

[57] ABSTRACT

A method for molding fiber reinforced articles with superior mechanical properties by injection molding. The method includes heating a mixture of molding compound and chopped fiber to produce highly viscous substance. Pressure is applied to force the substance through an elongated injection slot oriented perpendicular to the major axial dimension of the finished article, causing the fiber planes to become oriented in a unique whorled, accordion like manner. The unusual fiber plane orientation reinforces the article such that it is resistant to crack propagation.

4 Claims, 4 Drawing Sheets

FIG.1B
FIG.2B

INJECTION MOLDING OF FIBER REINFORCED ARTICLES

TECHNICAL FIELD

The present invention relates to injection molding, especially to injection port geometry and related processing parameters for producing fiber reinforced articles possessing a unique whorled, accordion like fiber plane orientation.

BACKGROUND ART

Fiber reinforcement is a known, commonly used method of increasing the mechanical properties of thermoplastic, glass, and glass ceramic materials. Hereafter referred to as molding compounds, these materials are described, for example, in U.S. Pat. Nos. 4,314,852, 4,324,843, and 3,926,904 (incorporated herein by reference). The fibers used for reinforcement vary according to the desired application. These fibers include: carbon base fibers, boron base fibers, glass fibers, silicon carbide fibers, metal fibers, and others. Carbon base fibers are light weight, strong, highly electrically conductive, and are easily oxidized, with a low upper temperature limit in oxidizing atmospheres. Boron base fibers are easily oxidized, similar to carbon fibers, yet have excellent heat-shock resistance and are noncombustible. Glass fibers, good insulators and noncombustible, can lose strength above about 315° C. Silicon carbide fibers can be resistant to oxidation at high temperatures, electrically conductive, noncombustible, and have excellent thermal conductivity. Metal fibers possess extremely high tensile strength, with other properties ranging between noncombustibility to oxidizing at low temperatures. The above mentioned fibers and others will hereafter be referred to as fibers.

Critical factors affecting the composites' mechanical properties include fiber dispersion and orientation. For instance, composites containing unidirectionally oriented fibers possess high tensile strength in the direction of the fibers, and low tensile strength perpendicular to the fiber orientation; while randomly oriented fiber composites display a fairly uniform tensile strength in all directions.

One fabrication method for producing fiber reinforced composites having complex shapes and desired fiber orientation involves hot press molding of glass infiltrating woven and/or non-woven fiber preforms as described in U.S. Pat. No. 4,412,854 (incorporated herein by reference). Related techniques that are suitable for complex shapes, used with matrix transfer molding are described in U.S. Pat. Nos. 4,786,304 and 4,428,763 (incorporated herein by reference). Transfer molding, a process similar to injection molding, consists of softening thermoplastic resin in a chamber with heat and pressure and forcing it by high pressure through an orifice into a closed mold.

An injection molding technique, not requiring fiber pre-arrangement yet obtaining fiber dispersion, consists of injecting a discontinuous fiber/molding compound mixture into a die as disclosed in U.S. Pat. Nos. 4,464,192 and 4,780,432 (incorporated herein by reference). Injection molding, described in the above mentioned patents, consists of feeding a molding compound into a heating chamber and heating it to a viscous liquid, and then, via a plunger, forcing the material into a mold and keeping it under pressure until cool.

Injection molding of fiber reinforced molding compounds, without pre-arranged fibers, fail to fully solve the problem of obtaining a controllable fiber orientation which will produce the optimum mechanical strength. For example, in cylindrical orifice injection molding, as described in U.S. Pat. No. 4,780,432, fibers lie on paraboloidal shaped planes susceptible to crack propagation (FIG. 1A) between such planes.

The object of this invention is to introduce an oscillatory flow of the molding compound into the mold cavity, to produce a shaped composite with desired fiber dispersion and orientation obtaining superior, quasi isotropic, mechanical strength.

DISCLOSURE OF INVENTION

The present invention is directed to a method of forming fiber reinforced articles through injection molding. A mixture of molding compound and fibers are heated and pressurized to force the viscous mixture through an elongated slot-like injection port into a die. The injection port, a crucial aspect of the invention, is located essentially parallel to the major axial dimension of the article, is approximately the length of the article, is a fraction of the width of the article, and has a depth sufficient to orient the fibers with the flow. The injection port geometry and orientation relative to the mold cavity cause the fiber planes to form a whorled, accordion-like pattern within the article. The process results in the fiber planes becoming intertwined, creating superior tensile strength throughout the article.

The foregoing and other features and advantages of the present invention will become more apparent from the following description and accompanying drawings.

BRIEF DESCRIPTION OF DRAWINGS

FIG. 1B shows the fiber plane orientation obtained by edge slot port injection molding.

BEST MODE FOR CARRYING OUT THE INVENTION

Figure 2A:
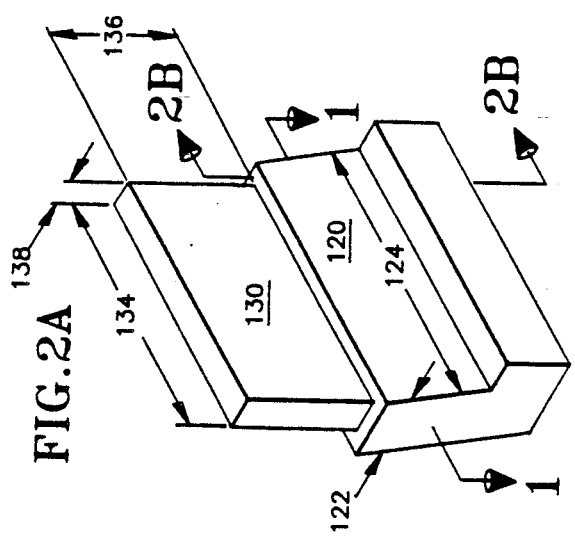
FIG. 2 shows a molded article formed using the present invention and the fiber plane orientation created.

A basic embodiment of the invention is shown in FIG. 2 where article (120) is the desired product produced using a die with an injection port (130) of specific geometry and location; this being a crucial controlling factor of fiber plane orientation. The injection port's elongated slot-like geometry includes: a length (134) as close to the full length of the major axial dimension (124) as is practical to arrange, a thickness (138), usually, between about 30 and about 70 percent of the die or finished article thickness (122), a depth (136) sufficient to initially orient the fibers with the flow, and location essentially perpendicular to the major axial dimension (124) of the finished article.

Any high temperature thermoplastic resin, glass ceramic, or glass matrix/fiber system may be used as the molding compound in this process. On the basis of flexure strength, and oxidation and wear resistance of hot pressed chopped fiber composites, a glass matrix/carbon fiber was chosen for the specific application of a gas turbine engine inner shroud. The molding compound formulation range lies between 18 and 36 v/o, and especially between 25 and 30 v/o for the ½ inch carbon fiber/glass used, and the optimum fiber length for the chosen article (FIG. 2) is ½ inch. For finely detailed articles, the fiber length can be reduced to obtain the desirable fiber orientation throughout the article and good detailed surface replication.

The optimum fabrication temperature ranged from 1200° C. to 1275° C. for the particular carbon fiber/glass matrix system used. The viscosity, another significant factor and a function of the temperature, is approximately $10^6$–$10^7$ poise for HMU-3K fiber/7070 glass in this temperature range. Note, however, this is only the desired viscosity for the carbon fiber/glass used, different viscosity ranges may apply for the other viable thermoplastic resin, ceramic, or glass systems such as those described in U.S. Pat. Nos. 4,314,852, 4,324,843, and 3,926,904.

Figure 4:
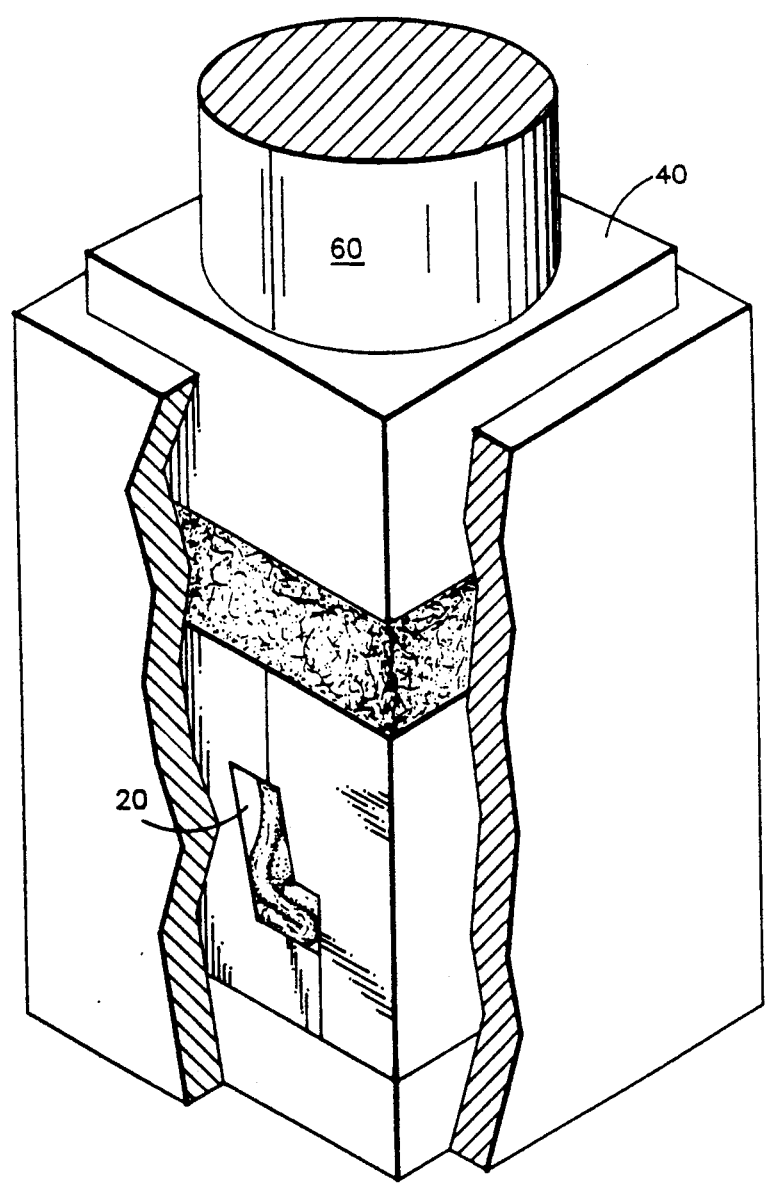
FIG. 4 is a schematic of the invention process.

When the parameters mentioned above are satisfied, a unique, whorled, accordion like fiber plane orientation results (FIG. 2B; obtained from (2B) in FIG. 2). The viscosity, flow rate, and geometric relation between the injection port and mold cavity are presumed to create an oscillating flow pattern entering the die cavity (FIG. 4), which induces a folding of the fiber planes, causing them to become interlocked. Consequently, the article resists crack propagation on most planes. The invention will be clarified by reference to the following illustrative example.

EXAMPLE

The following procedure can be used to prepare a fiber reinforced glass article.

Figure 3:
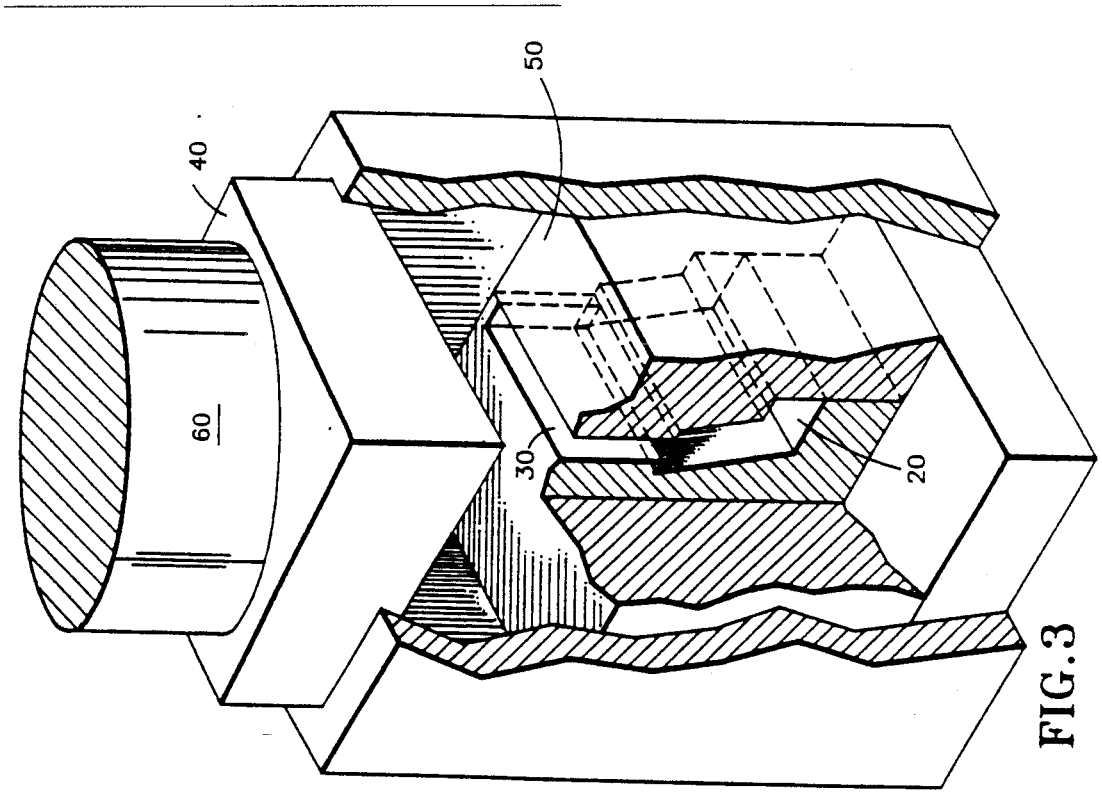
FIG. 3 is a cross sectional view of an injection mold assembly useful with the present invention.

A preconsolidated molding compound of 25 to 30 v/o ½ inch Hercules Inc. HMU-3K carbon fiber/code 7070 low sodium borosilicate glass/colloidal silica (Ludox ®) binder is placed in the reservoir (50) (FIG. 3), before inserting the plunger (40) into the injection mold assembly.

2. The mold assembly is placed below the ram (60) in a hot press furnace chamber; the two part mold assembly having a die (20) which has a height of 2.54 cm, a length of 7.62 cm, and a thickness of 1.11 cm, and has an injection port (30) which has a length of 6.51 cm, a width of 0.57 cm, and a depth of 3.05 cm.

3. The mold assembly is heated to furnace temperature set point of 1275° C.

4. The ram (60) and plunger (40) are used to apply 1000 psi hydrostatic pressure when the thermocouple indicates 1100° C.

Figure 1A:
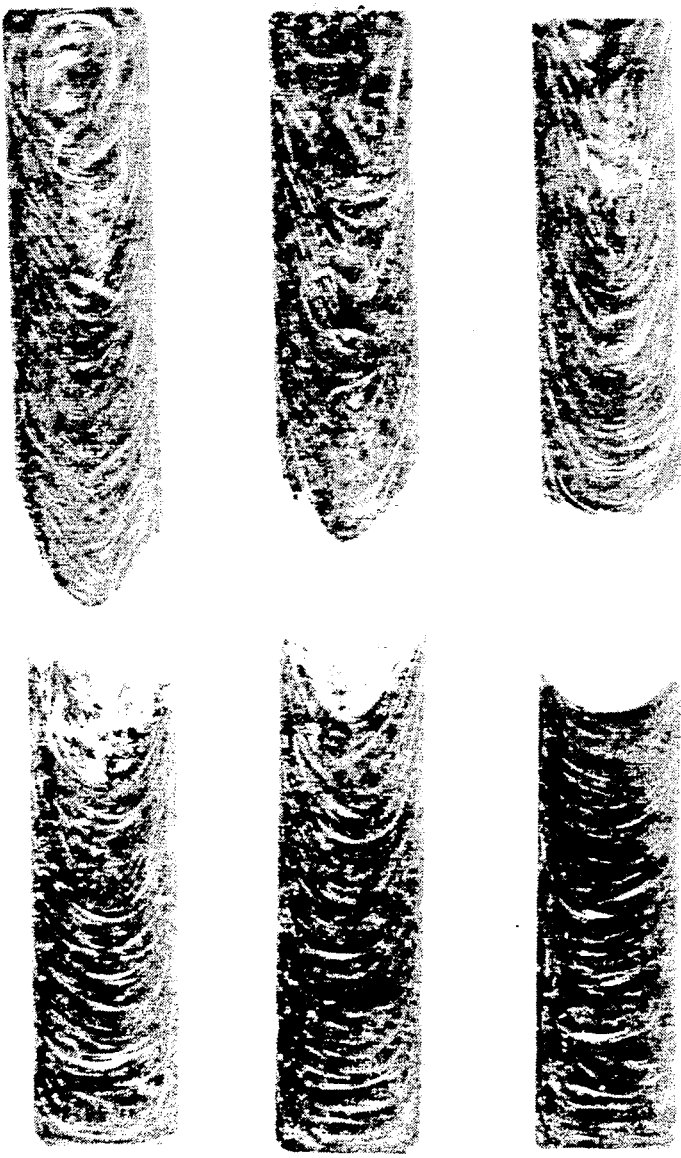
FIG. 1A shows the fiber plane orientation obtained by axial cylindrical port injection molding.

The molding compound volume flow rate, linear flow rate through the slot, and the viscosity obtained were calculated to be approximately 0.615 cc/sec, 0.163 cm/sec, and $4 \times 10^6$ poise respectively. FIGS. 1A and 1B show the results of this experiment as opposed to the prior art (test samples obtained as shown by (1) in FIG. 2); the flexure strengths of a cylindrical port injection molded composite (FIG. 1A) versus a slot port injection molded composite (FIG. 1B (present invention). It can clearly be seen from the fiber plane orientation with the samples and the test results that (FIG. 1A) possesses a relatively low flexure strength throughout the structure, while (FIG. 1B) possess uniformly high flexure strengths with the desired fiber dispersion and fiber plane orientation.

Although this invention has been shown and described with respect to detailed embodiments thereof, it will be understood by those skilled in the art that various changes in form and detail thereof may be made without departing from the spirit and scope of the claimed invention.

I claim:

1. A method for producing a fiber reinforced article from a mixture of a molding compound and fibers with a hot press assembly, said assembly having a die with a length dimension, a thickness dimension perpendicular to the length dimension and a height; and a slot shaped injection port located essentially parallel to the length of the die, having a length close to the full length of the die, a thickness parallel to and 30–70% of the thickness of the die and a depth sufficient to initially orient the fibers in the mixture and such that the mixture enters the die essentially perpendicular to the length which comprises:
   (a) heating the mixture to a point where it will flow under pressure and;
   (b) applying pressure to force the heated mixture through the injection port into the die wherein the mixture viscosity, flow rate, and geometric relation between the injection port and the mold cavity are selected to create an oscillating flow pattern entering the die cavity causing the fiber planes to become interlocked in an accordion like manner whereby an article having improved mechanical properties is obtained.

2. A method as in claim 1 wherein the fiber content is approximately 18 to 36 v/o.

3. A method as in claim 1 wherein the molding compound is selected from the group consisting of thermoplastic resin, glass, glass ceramic, and ceramic material.

4. A method as in claim 1 wherein the fibers are selected from the group consisting of graphite base, silicon carbide, mullite, boron base, alumina base, and zirconia base.

* * * * *